United States Patent
Sun et al.

(10) Patent No.: US 12,040,868 B2
(45) Date of Patent: Jul. 16, 2024

(54) CMR AND IMR CONFIGURATION ENHANCEMENT FOR MULTI-TRP CSI-RS REPORTING

(71) Applicant: APPLE INC., Cupertino, CA (US)

(72) Inventors: Haitong Sun, Cupertino, CA (US); Chunxuan Ye, San Diego, CA (US); Dawei Zhang, Cupertino, CA (US); Hong He, Cupertino, CA (US); Jie Cui, Cupertino, CA (US); Oghenekome Oteri, San Diego, CA (US); Seyed Ali Akbar Fakoorian, San Diego, CA (US); Wei Zeng, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 317 days.

(21) Appl. No.: 17/593,304

(22) PCT Filed: May 10, 2021

(86) PCT No.: PCT/CN2021/092730
§ 371 (c)(1),
(2) Date: Sep. 15, 2021

(87) PCT Pub. No.: WO2022/236566
PCT Pub. Date: Nov. 17, 2022

(65) Prior Publication Data
US 2023/0216566 A1 Jul. 6, 2023

(51) Int. Cl.
*H04B 7/06* (2006.01)
*H04W 24/10* (2009.01)

(52) U.S. Cl.
CPC .......... *H04B 7/0626* (2013.01); *H04W 24/10* (2013.01)

(58) Field of Classification Search
CPC .... H04B 7/0626; H04W 24/10; H04L 5/0048; H04L 5/0057; H04L 5/0094
See application file for complete search history.

(56) References Cited

U.S. PATENT DOCUMENTS

| | | | |
|---|---|---|---|
| 2013/0107832 A1* | 5/2013 | Kim ...................... | H04L 5/0035 370/329 |
| 2014/0133336 A1* | 5/2014 | Park ..................... | H04B 7/0626 370/252 |

(Continued)

FOREIGN PATENT DOCUMENTS

| | | |
|---|---|---|
| CN | 110612734 A | 12/2019 |
| CN | 112204899 A | 1/2021 |
| WO | 2020089863 A1 | 5/2020 |

OTHER PUBLICATIONS

Apple Inc., "Views on Rel-17 CSI enhancement", R1-2101356, 3GPP TSG RAN WG1 #104-e, e-Meeting, Agenda Item 8.1.4, Jan. 25-Feb. 5, 2021, 7 pages.

(Continued)

*Primary Examiner* — Christine Ng
(74) *Attorney, Agent, or Firm* — Dorsey & Whitney LLP

(57) ABSTRACT

Configuring channel state information reference signal (CSI-RS) reporting at a network may include encoding a single CSI-RS reporting configuration for transmission to a user equipment (UE) that is in connected mode with both a first transmission and reception point (TRP) and a second TRP. The single CSI-RS reporting configuration may include a plurality of CSI-RS resource sets. Each of the plurality of CSI-RS resource sets may include a plurality of CSI-RS resources. At least one of the plurality of CSI-RS resource sets may include CSI-RS resources that correspond to the first TRP or the second TRP. A CSI measurement communication received from the UE may be decoded. The CSI measurement communication may be based on the (Continued)

single CSI-RS reporting configuration communication. Based on the CSI measurement communication, one or more downlink data transmissions may be scheduled.

20 Claims, 8 Drawing Sheets

(56) References Cited

U.S. PATENT DOCUMENTS

| | | | | |
|---|---|---|---|---|
| 2014/0177601 | A1* | 6/2014 | Nishio | H04B 7/024 |
| | | | | 370/332 |
| 2015/0003271 | A1* | 1/2015 | Park | H04L 27/2613 |
| | | | | 370/252 |
| 2016/0142189 | A1* | 5/2016 | Shin | H04B 7/0626 |
| | | | | 370/329 |
| 2020/0178241 | A1* | 6/2020 | Wu | H04L 1/0026 |
| 2020/0205149 | A1* | 6/2020 | Khoshnevisan | H04L 1/1854 |
| 2021/0167911 | A1* | 6/2021 | Xiao | H04W 72/0446 |
| 2022/0094399 | A1* | 3/2022 | Gao | H04B 7/0417 |
| 2022/0173847 | A1* | 6/2022 | Chen | H04L 5/0007 |
| 2022/0248246 | A1* | 8/2022 | Berliner | H04B 7/0695 |
| 2022/0286175 | A1* | 9/2022 | Matsumura | H04B 7/0617 |
| 2022/0376856 | A1* | 11/2022 | Li | H04L 5/0048 |
| 2023/0189037 | A1* | 6/2023 | Matsumura | H04L 5/0035 |
| | | | | 370/252 |
| 2023/0308231 | A1* | 9/2023 | Dutta | H04W 24/08 |
| | | | | 370/252 |

OTHER PUBLICATIONS

Nec, "Discussion on CSI enhancement for multi-TRP transmission", R1-2100954, 3GPP TSG RAN WG1 #104-e, e- Meeting, Agenda Item 8.1.4, Jan. 25-Feb. 5, 2021, 4 pages.

PCT/CN2021/092730, International Search Report and Written Opinion, dated Feb. 10, 2022, 9 pages.

CATT, "Discussion on CSI enhancements for mTRP and FDD reciprocity", R1-2102604, 3GPP TSG RAN WG1 Meeting #104b-e e-Meeting, Agenda 8.1.4, Apr. 12-20, 2021, 14 pages.

Huawei, Hisilicon, "CSI measurement enhancement for multi-TRP/ panel transmission", R1-1903100, 3GPP TSG RAN WG 1 Meeting #96, Athens, Greece, Agenda Item 7.2.8.6, Feb. 25.-Mar. 1, 2019, 6 pages.

NTT Docomo, Inc, "Discussion on CSI enhancements", R1-2101603, 3GPP TSG RAN WG1 #104-e, e-Meeting, Agenda Item 8.1.4, Jan. 25-Feb. 5, 2021, 16 pages.

Spreadtrum Communications, "Discussion on Multi-TRP transmission", R1-1912562, 3GPP TSG RAN WG1 #99, Reno, USA, Agenda Item: 7.2.8.2, Nov. 18-22, 2019, 10 pages.

VIVO, "Evaluation on MTRP CSI and Partial reciprocity", R1-2005369, 3GPP TSG RAN WG1 #102-e, e-Meeting, Agenda Item 8.1.4, Aug. 17-28, 2020, 19 pages.

* cited by examiner

CMR AND IMR CONFIGURATION ENHANCEMENT FOR MULTI-TRP CSI-RS REPORTING

TECHNICAL FIELD

This application relates generally to wireless communication systems, including multi-TRP CSI-RS reporting.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

In 3GPP Release 16 (Rel-16), six different schemes have been designed for multi-transmission and reception point (TRP) operation, including: 1. Multi-downlink control information (DCI) based Multi-TRP operation; and 2. Single-DCI based Multi-TRP operation, which includes: a. Spatial Domain Multiplexing (SDM) Scheme, which includes a single Transport Block (TB); b. Frequency Domain Multiplexing (FDMSchemeA), which includes a single TB; c. FDMSchemeB, which includes a dual TB; d. Time Domain Multiplexing (TDMSchemeA), which includes intra-slot repetition; and e. Time Domain Multiplexing (Scheme 4), which includes inter-slot repetition.

However, Rel-16 does not include any channel state information reference signal (CSI-RS) processing enhancement. For instance, Rel-16 does not allow for performing explicit interference hypothetical testing to optimize a precoder for each TRP. In addition, Rel-16 does not allow efficient switching between single-TRP operation and multi-TRP operation.

Notably CSI reporting may include: 1. Reference signal configuration, which includes: a. Channel Measurement Resource (CMR); and b. Interference Measurement Resource (IMR), which may further include: i. Non-Zero Power (NZP) IMR (NZP-IMR) (also referred to herein as NZP-CSI-RS for interference); and ii. Zero Power ZP-IMR, (also referred to herein as CSI-IM); 2. Channel interference measurement; and 3. Report quantity.

Figure 1:
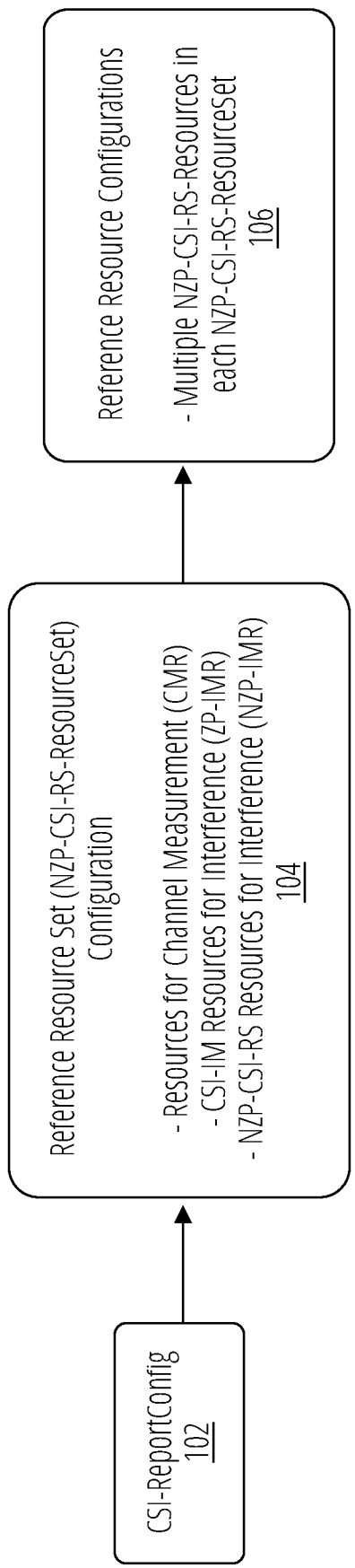
FIG. 1 illustrates an example embodiment of a CSI measurement configuration.

For reference, FIG. 1 illustrates an embodiment of a CSI measurement configuration in 5g new radio (NR). As illustrated, FIG. 1 includes block 102 representing a CSI-ReportConfig, block 104 representing a reference resource set (NZP-CSI-RS-ResourceSet) configuration, and block 106 representing reference resource configurations. As shown, the CSI-ReportConfig (as represented by block 102) may include a reference resource set configuration or NZP- CSI-RS-ResourceSet configuration, as represented by block 104. In particular, the NZP-CSI-RS-ResourceSet configuration may include one or more of: 1. Resources for channel measurement (CMR); 2. CSI-IM resources for interference (ZP-IMR); and 3. NZP-CSI-RS resources for interference (NZP-IMR). The reference resource set configuration of block 104 may then include multiple NZP-CSI-RS-Resources (i.e., the actual resources) in each NZP-CSI-RS-ResourceSet, as represented by block 106.

Figure 2:
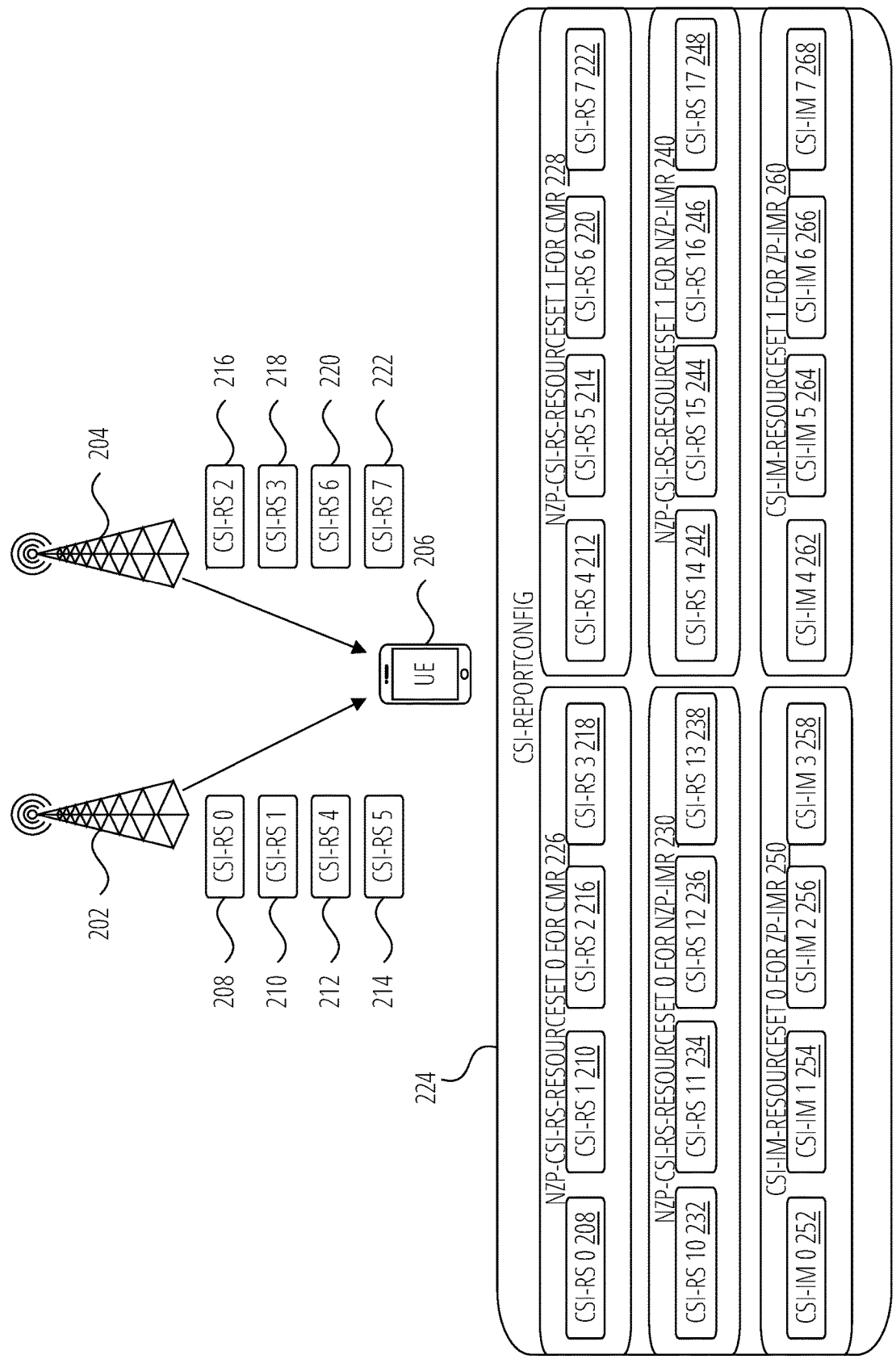
FIG. 2 illustrates an example embodiment of a design of a single CSI-RS reporting configuration in a multi-TRP environment.

FIG. 2 illustrates an example embodiment of a design in which CSI-RS-Resources in each CSI-RS-ResourceSet can be configured to be associated with a different TRP. As shown, FIG. 2 includes TRP 202 and TRP 204 that are each configured to communicate with a UE 206. As further shown, each TRP (i.e., TRP 202 and TRP 204) includes various CSI-RS resources. In particular, the TRP 202 includes CSI-RS 0 208, CSI-RS 1 210, CSI-RS 4 212, and CSI-RS 5 214, while the TRP 204 includes CSI-RS 2 216, CSI-RS 3 218, CSI-RS 6 220, and CSI-RS 7 222.

A single CSI-ReportConfig 224 may then include various resource sets for CMR, NZP-IMR, and ZP-IMR (i.e., block 226, block 228, block 230, block 240, block 250, and block 260). As shown, each resource set may include some resources (i.e., CSI-RS 0 208, CSI-RS 1 210, CSI-RS 4 212, CSI-RS 5 214, CSI-RS 2 216, CSI-RS 3 218, CSI-RS 6 220, CSI-RS 7 222, CSI-RS 10 232, CSI-RS 11 234, CSI-RS 12 236, CSI-RS 13 238, CSI-RS 14 242, CSI-RS 15 244, CSI-RS 16 246, CSI-RS 17 248, CSI-IM 0 252, CSI-IM 1 254, CSI-IM 2 256, CSI-IM 3 258, CSI-IM 4 262, CSI-IM 5 264, CSI-IM 6 266, and CSI-IM 7 268) corresponding to TRP 202 and some resources corresponding to TRP 204. For instance, NZP-CSI-RS-ResourceSet 0 for CMR (as represented by block 226) includes two resources corresponding to TRP 202 (i.e., CSI-RS 0 208 and CSI-RS 1 210) and two resources corresponding to TRP 204 (i.e., CSI-RS 2 216 and CSI-RS 3 218).

Notably, only four resources are represented as corresponding to each TRP, however, each of the resources included within the resource sets for CMR, NZP-IMR, and ZP-IMR (i.e., block 226, block 228, block 230, and so forth) may correspond to either the TRP 202 or the TRP 204. As such, each TRP may have any number of applicable corresponding resources.

The principles described herein include proposals for CMR and IMR configuration enhancements corresponding to Multi-TRP CSI reporting. In particular, a first proposal is related to a CSI-RS resource set (i.e., NZP-CSI-RS-ResourceSet) with respect to single CSI-ReportConfig embodiments (i.e., similar to the example embodiment of FIG. 2) and a second proposal related to embodiments having two CSI-ReportConfigs (i.e., similar to the example embodiment of FIG. 3).

The first proposal which is associated with a CSI-RS resource set corresponding to a single CSI-ReportConfig (i.e., similar to the embodiment shown in FIG. 2) may include various subproposals. In a first subproposal, configuring different NZP-CSI-RS resources for different TRP in a same NZP-CSI-RS-ResourceSet may include various options. First, in an NZP-CSI-RS-ResourceSet, two lists of NZP-CSI-RS resources can be configured—one for each TRP. For instance, see the following:

```
NZP-CSI-RS-ResourceSet ::=    SEQUENCE {
    nzp-CSI-ResourceSetId         NZP-CSI-RS-ResourceSetId,
    nzp-CSI-RS-Resources          SEQUENCE (SIZE (1..maxNrofNZP-CSI-RS-
ResourcesPerSet)) OF NZP-CSI-RS-ResourceId,
    nzp-CSI-RS-Resources_Ext      SEQUENCE (SIZE (1..maxNrofNZP-CSI-RS-
ResourcesPerSet)) OF NZP-CSI-RS-ResourceId,
    repetition                    ENUMERATED { on, off }   OPTIONAL, -- Need S
    aperiodicTriggeringOffset     INTEGER(0..6)            OPTIONAL, -- Need S
    trs-Info                      ENUMERATED {true}        OPTIONAL, -- Need R
    ...,
    [[
    aperiodicTriggeringOffset-r16   INTEGER(0..31)         OPTIONAL -- Need S
    ]]
}
```

In a second option, within each NZP-CSI-RS-Resource, a virtual ID can be configured to logically associate each resource with different TRPs. For instance, see the following:

```
NZP-CSI-RS-Resource ::=   SEQUENCE {
    nzp-CSI-RS-ResourceId     ,
    ResourceGroupID           INTEGER (0,1),      OPTIONAL, -- Need R
    resourceMapping           CSI-RS-ResourceMapping,
    powerControlOffset        INTEGER (-8..15),
    powerControlOffsetSS      ENUMERATED{db-3, db0, db3, db6} OPTIONAL, --
Need R
    scramblingID              ScramblingId,
    periodicityAndOffset      CSI-ResourcePeriodicityAndOffset  OPTIONAL, --
Cond PeriodicOrSemiPersistent
    qcl-InfoPeriodicCSI-RS    TCI-StateId         OPTIONAL,  -- Cond Periodic
    ...
}
```

In a third option, a bitmap can be configured in an NZP-CSI-RS-ResourceSet to map each NZP-CSI-RS resource to an individual TRP (e.g., 0 for TRP1 and 1 for TRP2). Finally, in a fourth option of the first subproposal, configuring different NZP-CSI-RS-Resources for different TRPs may be based on an implicit rule. For instance, a flag in an NZP-CSI-RS-ResourceSet may equally split CSI-RS resources between two TRPs. In an explicit example, the first half of such resources may be configured for a first TRP and the second half of such resources may be configured for a second TRP.

The second subproposal of the first proposal (i.e., a CSI-RS resource set corresponding to a single CSI-ReportConfig) is related to restrictions on the port configuration for NZP-CSI-RS-Resources for different TRPs in the same CSI-ReportConfig. The second subproposal includes the following two options: 1. The same number of ports may be configured in different NZP-CSI-RS-Resources for different TRPs in the same CSI-ReportConfig; or 2. A different number of ports can be configured in different NZP-CSI-RS-Resources for different TRPs in the same CSI-ReportConfig.

The third subproposal of the first proposal (i.e., a CSI-RS resource set corresponding to a single CSI-ReportConfig) is related to further restrictions on the CMR configuration when enhanced Multi-TRP CSI is configured. The third subproposal includes the following four options: 1. Only one NZP-CSI-RS-ResourceSet can be configured and the same number of NZP-CSI-RS-Resources are to be configured for each TRP (e.g., TRP1 and TRP2); 2. One NZP-CSI-RS-ResourceSet can be configured and a different number of NZP-CSI-RS-Resources are to be configured for each TRP (e.g., TRP1 and TRP2); 3. More than one NZP-CSI-RS-ResourceSet can be configured, however, in each NZP-CSI-RS-ResourceSet, NZP-CSI-RS-Resources are to be split equally between each of multiple TRPs. Option 3 may be particularly suited for embodiments having more than two TRPs. In an example having three TRPs, for a first set with a total of 36 resources, 12 resources may be configured for each of TRP1, TRP2, and TRP3. In another example with four TRPs, for a second set with 16 total resources, four resources may be configured for each of TRP1, TRP2, TRP3, and TRP4); or 4. More than one NZP-CSI-RS-ResourceSet can be configured, in each NZP-CSI-RS-ResourceSet, NZP-CSI-RS-Resources can be split freely between multiple TRPs. Option four may be particularly suited for embodiments having more than two TRPs.

The fourth subproposal of the first proposal (i.e., a CSI-RS resource set corresponding to a single CSI-ReportConfig) is related to further restrictions on the NZP-IMR configuration when enhanced Multi-TRP CSI is configured. The fourth subproposal includes the following two options: 1. Resources configured in NZP-IMR are not associated with any specific TRP. In other words, all the resources configured for NZP-IMR are shared between the multiple TRPs; or 2. Resources configured in NZP-IMR can be associated with a specific TRP.

The fifth subproposal of the first proposal (i.e., a CSI-RS resource set corresponding to a single CSI-ReportConfig) is related to further restrictions on the ZP-IMR configuration when enhanced Multi-TRP CSI is configured. The fifth subproposal includes the following two options: 1. CSI-IM resources configured in ZP-IMR are not associated with any specific TRP. In other words, all the CSI-IM resources configured for ZP-IMR are shared between the multiple TRPs; or 2. CSI-IM resources configured in ZP-IMR can be associated with a specific TRP or a specific pair of TRPs.

The sixth subproposal of the first proposal (i.e., a CSI-RS resource set corresponding to a single CSI-ReportConfig) is related to further restrictions on the ZP-IMR and NZP-IMR configuration when enhanced Multi-TRP CSI is configured. In particular, the sixth subproposal includes the same number of resources configured with respect to CMR being configured for ZP-IMR and/or NZP-IMR. In such cases, each ZP-IMR/NZP-IMR resource may be one-to-one mapped to a CMR resource for single-TRP hypothesis or a pair of the CMRs for multi-TRP hypothesis. In addition, the mapping of ZP-IMR/NZP-IMR resources to TRPs may implicitly follow the corresponding CMR resource.

The seventh subproposal of the first proposal (i.e., a CSI-RS resource set corresponding to a single CSI-ReportConfig) is related to interference measurements based on CMR when enhanced Multi-TRP CSI is configured. The seventh subproposal includes the following two options: 1. The CMR of the first TRP is not considered as the interference (i.e., IMR) of the second TRP; or 2. The CMR of the first TRP is considered as the interference (i.e., IMR) of the second TRP. Regarding the second option, the Precoding Matrix Indication (PMI), Rank Indicator (RI), and CMR of the first TRP is considered as the interference of the second TRP. In addition, for the transmit power assumption of the interference calculation with respect to the second option, the following two alternatives may apply: a. The powerControlOffset configured per NZP-CSI-RS-Resource may be reused; or b. A new power offset Information Element (IE) (e.g., powerControlOffsetInf) may be introduced for the power offset between PDSCH and NZP-CSI-RS when PDSCH is acting as interference.

The eighth subproposal of the first proposal (i.e., a CSI-RS resource set corresponding to a single CSI-ReportConfig) is related to interference measurements based on IMR when enhanced Multi-TRP CSI is configured. The eighth subproposal includes the following two options: 1. For each TRP, all the configured IMR resources are considered; or 2. For each TRP, only the associated IMR resources are considered (i.e., limited to a CMR associated with a given IMR). As part of the second option, it may be assumed that IMR association with TRP and/or IMR associated with CMR is allowed.

Figure 3:
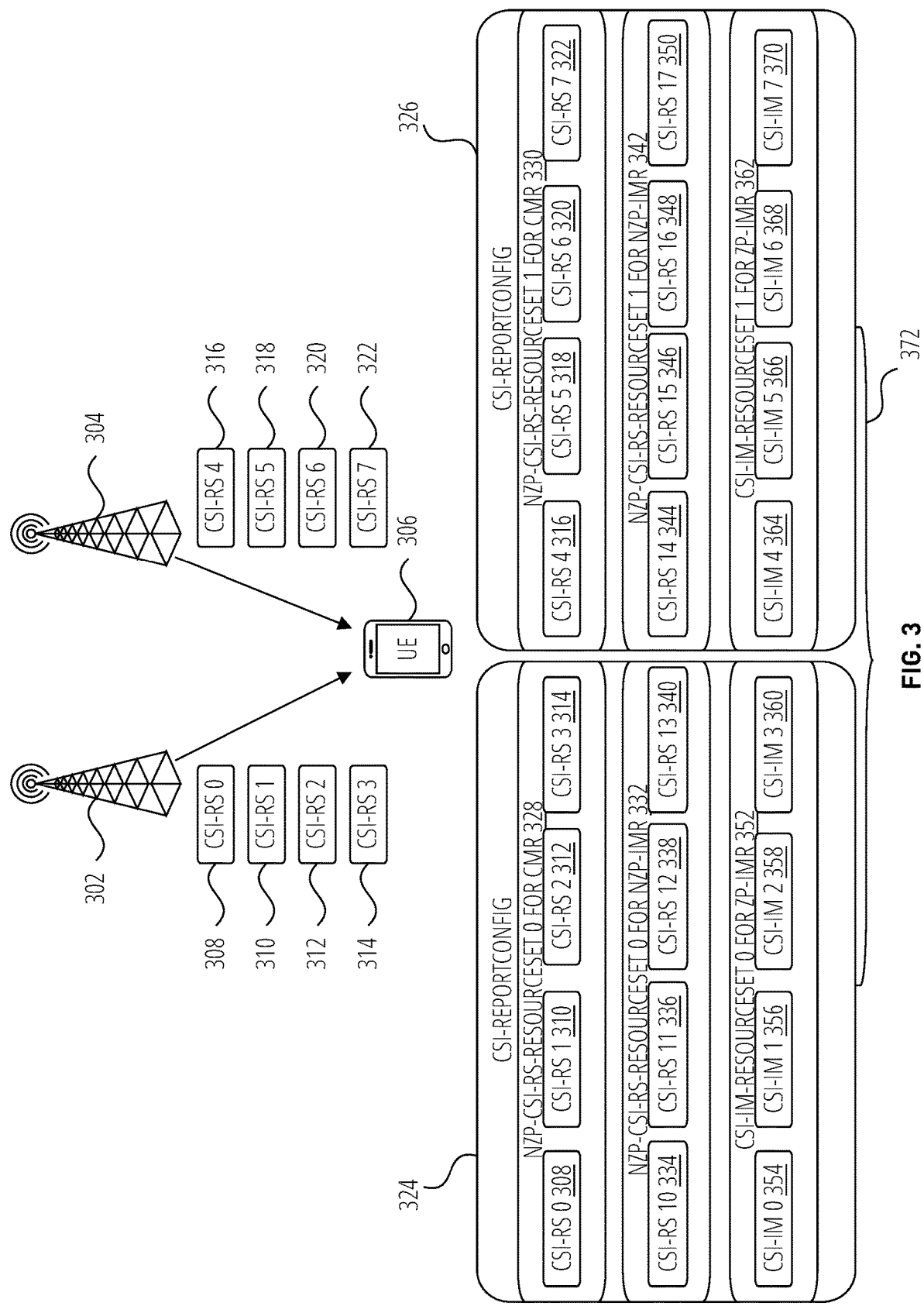
FIG. 3 illustrates an example embodiment of a design of two CSI-RS reporting configurations in a multi-TRP environment.

FIG. 3 illustrates an example embodiment of a design in which NZP-CSI-RS-Resources in each NZP-CSI-RS-ResourceSet can be configured to be associated with a particular TRP of two TRPs. As shown, FIG. 3 includes TRP 302 and TRP 304 that are each configured to communicate with a UE 306. As further shown, each TRP (i.e., TRP 302 and TRP 304) includes various CSI-RS resources. In particular, the TRP 302 includes CSI-RS 0 308, CSI-RS 1 310, CSI-RS 2 312, and CSI-RS 3 314, while the TRP 304 includes CSI-RS 4 316, CSI-RS 5 318, CSI-RS 6 320, and CSI-RS 7 322.

Two CSI-ReportConfigs (i.e., CSI-ReportConfig 324 and CSI-ReportConfig 326) may then include various resource sets for CMR, NZP-IMR, and ZP-IMR (i.e., block 328, block 330, block 332, block 342, block 352, and block 362), wherein each resource set within a given CSI-ReportConfig includes resources (i.e., CSI-RS 0 308, CSI-RS 1 310, CSI-RS 2 312, CSI-RS 3 314, CSI-RS 4 316, CSI-RS 5 318, CSI-RS 6 320, CSI-RS 7 322, CSI-RS 10 334, CSI-RS 11 336, CSI-RS 12 338, CSI-RS 13 340, CSI-RS 14 344, CSI-RS 15 346, CSI-RS 16 348, CSI-RS 17 350, CSI-IM 0 354, CSI-IM 1 356, CSI-IM 2 358, CSI-IM 3 360, CSI-IM 4 364, CSI-IM 5 366, CSI-IM 6 368, and CSI-IM 7 370) corresponding to a single TRP. For instance, each resource included within the resource sets of CSI-ReportConfig 324 corresponds to TRP 302 while each resource included within the resource sets of CSI-ReportConfig 326 corresponds to TRP 304.

Notably, only four resources are represented as corresponding to each TRP, however, each of the resources included within the resource sets for CMR, NZP-IMR, and ZP-IMR (i.e., block 328, block 330, block 332, and so forth) may correspond to either the TRP 302 or the TRP 304. As such, each TRP may have any number of applicable corresponding resources. In addition, bracket 372 illustrates that some association rule may be created to associate the two different CSI-ReportConfigs (i.e., CSI-ReportConfig 324 and CSI-ReportConfig 326), as further described within the subproposals of the second proposal below.

The second proposal, which is associated with a CSI-RS resource set corresponding to two CSI-ReportConfigs, includes various subproposals. In a first subproposal, two CSI-ReportConfigs may each be configured for a different TRP with an association rule defined between the two CSI-ReportConfigs, as discussed with respect to FIG. 3. In such embodiments, the following restrictions can be considered for the configuration corresponding to each CSI-ReportConfig: 1. Each CSI-ReportConfig may include the same carrier IE; 2. Each CSI-ReportConfig may include the same reportConfigType IE, including: a. The same periodic or semi-persistent time domain behavior; and b. The same pucch-CSI-ResourceList, reportSlotConfig, reportSlotOffsetList, and p0alpha; 3. Each CSI-ReportConfig may include the same reportQuantity; 4. Each CSI-ReportConfig may include the same reportFreqConfiguration; 5. Each CSI-ReportConfig may include the same timeRestrictionForChannelMeasurements and timeRestrictionForInterferenceMeasurements; 6. Each CSI-ReportConfig may include the same codebookConfig; 7. Each CSI-ReportConfig may include the same groupBasedBeamReporting; 8. Each CSI-ReportConfig may include the same cqi-Table; 9. Each CSI-ReportConfig may include the same subbandSize; and 10. Each CSI-ReportConfig may include the same non-PMI-PortIndication.

In the second subproposal, once again, two CSI-ReportConfigs may each be configured for a different TRP with an association rule defined between the two CSI-ReportConfigs, as discussed with respect to FIG. 3. The second proposal may include the following restrictions being considered for the RS configuration in each CSI-ReportConfig: 1. An independent CMR can be configured in each associated CSI-ReportConfig; and 2. For IMR, either NZP-IMR or ZP-IMR may apply, including the following two suboptions: a. The same NZP-IMR or ZP-IMR may be configured with respect to each CSI-ReportConfig; or b. Different NZP-IMRs or ZP-IMRs can be configured with respect to each CSI-ReportConfig.

In the third subproposal, once again, two CSI-ReportConfigs may each be configured for a different TRP with an association rule defined between the two CSI-ReportConfigs, as discussed with respect to FIG. 3. In particular, the third subproposal may include, for interference hypothesis, considering the CMR, PMI and RI from the first associated CSI-ReportConfig for the first TRP as the interference when computing the CSI in the second associated CSI-ReportConfig for the second TRP.

The fourth subproposal is related to configuring the association of the two CSI-ReportConfigs, which includes the following options: 1. In the first CSI-ReportConfig, a new IE is introduced to indicate the second CSI-ReportConfig with which the first CSI-ReportConfig is associated; 2. In CSI-MeasConfig, in which a list of all CSI-ReportConfigs are configured per serving cell, a new IE is introduced to associate two different CSI-ReportConfigs; 3. Duplicate CSI-ReportConfigs having the same CSI-ReportConfigId can be configured with limited differences in the IEs that are allowed to be configured in the CSI-ReportConfigs. In the third option, the same IE may be omitted in the duplicate CSI-ReportConfig.

Figure 4:
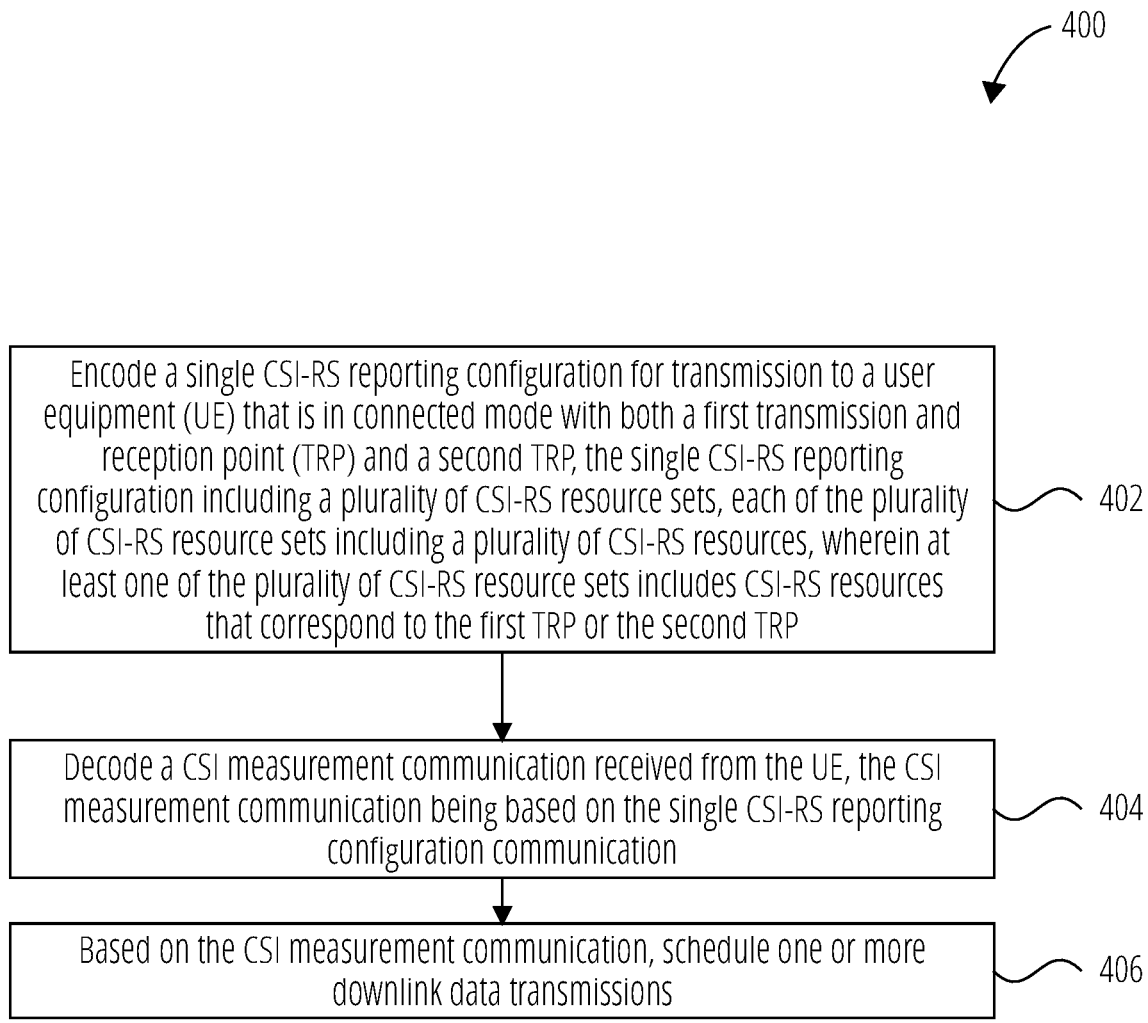
FIG. 4 illustrates a flowchart of a method for configuring CSI-RS reporting at a network, in accordance with one embodiment.

FIG. 4 illustrates a flowchart of a method 400 for configuring channel state information reference signal (CSI-RS) reporting at a network. In block 402, the method 400 encodes a single CSI-RS reporting configuration for transmission to a user equipment (UE) that is in connected mode with both a first transmission and reception point (TRP) and a second TRP. For instance, the network may encode a message having a CSI-ReportConfig for transmission to a UE. The single CSI-RS reporting configuration may include a plurality of CSI-RS resource sets. For instance, the single CSI-RS reporting configuration may comprise the CSI-ReportConfig 224 with CSI-RS resource sets such as those in block 226, block 230, and so forth of FIG. 2.

Each of the plurality of CSI-RS resource sets may include a plurality of CSI-RS resources. For instance, the CSI-RS resources CSI-RS 0 208, CSI-RS 1 210, CSI-RS 2 216, and CSI-RS 3 218 of the CSI-RS resource set shown within the block 226 of FIG. 2. At least one of the plurality of CSI-RS resource sets may include CSI-RS resources that correspond to the first TRP or the second TRP. For example, FIG. 2 includes the CSI-RS resources CSI-RS 0 208 and CSI-RS 1 210 that correspond to TRP 202 and the CSI-RS resources CSI-RS 2 216 and CSI-RS 3 218 that correspond to TRP 204.

In block 404, the method 400 decodes a CSI measurement communication received from the UE. The CSI measurement communication may be based on the single CSI-RS reporting configuration communication. For instance, the UE 206 may perform CRM and/or IMR measurements based on the configuration information within the CSI-ReportConfig 224. In block 406, the method 400, based on the CSI measurement communication, schedules one or more downlink data transmissions. In an example, the network may schedule one or more downlink transmissions based on the measurement information received from the UE.

The method 400 may also include at least one of the plurality of CSI-RS resource sets comprising a non-zero power CSI-RS (NZP-CSI-RS) resource set and the plurality of CSI-RS resources of the NZP-CSI-RS resource set comprising a plurality of NZP-CSI-RS resources. The method 400 may also include the NZP-CSI-RS resource set including a rule for splitting a first portion of the plurality of CSI-RS resources and a second portion of the plurality of CSI-RS resources between the first TRP and the second TRP. The plurality of CSI-RS resources may comprise a plurality of NZP-CSI-RS resources.

The method 400 may also include the rule for splitting the plurality of CSI-RS resources comprising a flag within the NZP-CSI-RS resource set directing the plurality of CSI-RS resources between the first TRP and the second TRP. The method 400 may also include the NZP-CSI-RS resource set being configured for channel measurement, the plurality of NZP-CSI-RS resources being configured as channel measurement resources (CMRs), and a same number of ports being configured for the first portion of the plurality NZP-CSI-RS resources corresponding to the first TRP and the second portion of the plurality of NZP-CSI-RS resources corresponding to the second TRP.

The method 400 may also include, when enhanced multi-TRP CSI is configured, the at least one of the plurality of CSI-RS resource sets comprising the NZP-CSI-RS resource set comprising a single NZP-CSI-RS resource set and the first portion of the plurality NZP-CSI-RS resources corresponding to the first TRP and the second portion of the plurality of NZP-CSI-RS resources corresponding to the second TRP comprising a same number of NZP-CSI-RS resources. The method 400 may further include the plurality of NZP-CSI-RS resources being configured as interference measurement resources (IMRs) and not corresponding to either the first TRP or the second TRP such that all of the plurality of NZP-CSI-RS resources are shared between the first TRP and the second TRP.

The method 400 may also include at least one of the plurality of CSI-RS resource sets comprising a zero power CSI-RS (CSI-IM) resource set configured for interference measurement and the plurality of CSI resources of the CSI-IM resource set comprising a plurality of CSI-IM resources. The method 400 may also include when the plurality of CSI-IM resources are configured as interference measurement resources (IMRs) and enhanced multi-TRP CSI is configured, the plurality of CSI-IM resources do not correspond to either the first TRP or the second TRP such that all of the plurality of CSI-IM resources are shared between the first TRP and the second TRP.

The method 400 may also include interference measurements associated with a particular TRP of the first TRP and the second TRP limited to considering IMRs corresponding to the particular TRP. The method 400 may also include one of the plurality of CSI-RS resource sets comprises a non-zero power CSI-RS (CSI-IM) resource set and the plurality of CSI-RS resources of the CSI-IM resource set comprise a plurality of CSI-IM resources, wherein the NZP-CSI-RS resource set is configured for channel measurement and the plurality of NZP-CSI-RS resources are configured as channel measurement resources (CMRs), wherein when enhanced multi-TRP CSI is configured, a same number of the plurality of CSI-IM resources are configured as a number of the plurality of NZP-CSI-RS resources including both single-TRP and multi-TRP hypothesis. The method 400 may also include CMRs of the first TRP comprising IMRs of the second TRP.

Embodiments contemplated herein include an apparatus comprising means to perform one or more elements of the method 400. This apparatus may be, for example, an apparatus of a base station (such as a network device 818 that is a base station, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a base station (such as a memory 822 of a network device 818 that is a base station, as described herein).

Embodiments contemplated herein include an apparatus comprising logic, modules, or circuitry to perform one or more elements of the method 400. This apparatus may be, for example, an apparatus of a base station (such as a network device 818 that is a base station, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a base station (such as a network device 818 that is a base station, as described herein).

Embodiments contemplated herein include a signal as described in or related to one or more elements of the method 400.

Embodiments contemplated herein include a computer program or computer program product comprising instructions, wherein execution of the program by a processing element is to cause the processing element to carry out one or more elements of the method 400. The processor may be a processor of a base station (such as a processor(s) 820 of a network device 818 that is a base station, as described herein). These instructions may be, for example, located in the processor and/or on a memory of the UE (such as a memory 822 of a network device 818 that is a base station, as described herein).

Figure 5:
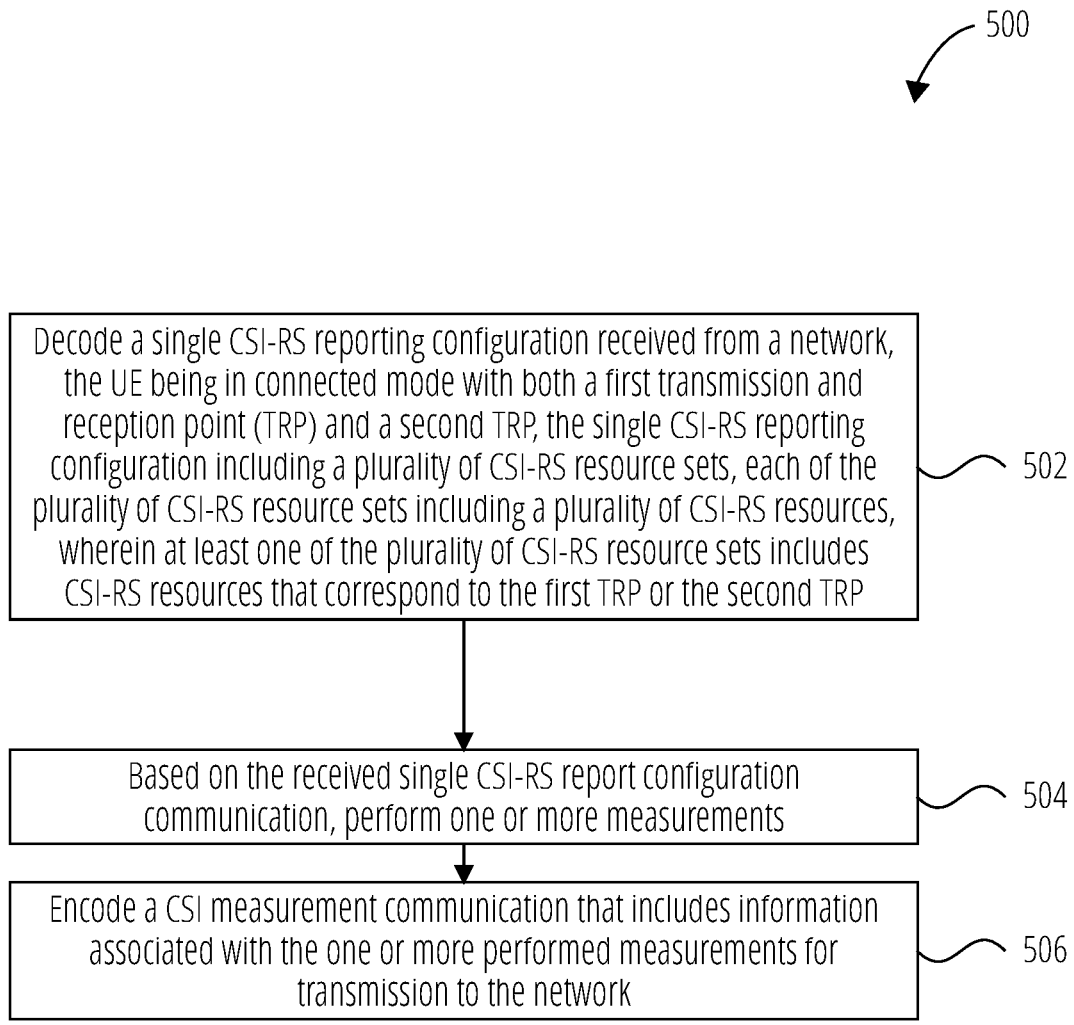
FIG. 5 illustrates a flowchart of a method for configuring CSI-RS reporting at a UE, in accordance with one embodiment.

FIG. 5 illustrates a flowchart of a method 500 for configuring channel state information reference signal (CSI-RS) reporting at a UE. In block 502, the method 500 decodes a single CSI-RS reporting configuration received from a network. For instance, the UE may decode a message having a CSI-ReportConfig received from the network. The UE may be in connected mode with both a first transmission and reception point (TRP) and a second TRP. For instance, the UE 206 may be in connected mode with the TRP 202 and the TRP 204. The single CSI-RS reporting configuration may include a plurality of CSI-RS resource sets. For instance, the single CSI-RS reporting configuration may comprise the CSI-ReportConfig 224 with CSI-RS resource sets such as those in block 226, block 230, and so forth of FIG. 2.

Each of the plurality of CSI-RS resource sets may include a plurality of CSI-RS resources. For instance, the CSI-RS resources CSI-RS 0 208, CSI-RS 1 210, CSI-RS 2 216, and CSI-RS 3 218 of the CSI-RS resource set shown within the block 226 of FIG. 2. At least one of the plurality of CSI-RS resource sets may include CSI-RS resources that correspond to the first TRP or the second TRP. For example, FIG. 2 includes the CSI-RS resources CSI-RS 0 208 and CSI-RS 1 210 that correspond to TRP 202 and the CSI-RS resources CSI-RS 2 216 and CSI-RS 3 218 that correspond to TRP 204.

In block 504, the method 500, based on the received single CSI-RS reports configuration communication, performing one or more measurements. For instance, the UE 206 may perform CMR and/or IMR measurements based on the configuration information within the CSI-ReportConfig 224. In block 506, the method 500 encodes a CSI measurement communication that includes information associated with the one or more performed measurements for transmission to the network. In an example, the network may schedule one or more downlink transmissions based on the measurement information received from the UE.

The method 500 may also include at least one of the plurality of CSI-RS resource sets comprising a non-zero power CSI-RS (NZP-CSI-RS) resource set and the plurality of CSI-RS resources of the NZP-CSI-RS resource set comprising a plurality of NZP-CSI-RS resources. The method 500 may also include the NZP-CSI-RS resource set including a rule for splitting a first portion of the plurality of CSI-RS resources and a second portion of the plurality of CSI-RS resources between the first TRP and the second TRP. The plurality of CSI-RS resources may comprise a plurality of NZP-CSI-RS resources.

Embodiments contemplated herein include an apparatus comprising means to perform one or more elements of the method 500. This apparatus may be, for example, an apparatus of a UE (such as a wireless device 802 that is a UE, as described herein).

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, a memory of a UE (such as a memory 806 of a wireless device 802 that is a UE, as described herein).

Embodiments contemplated herein include an apparatus comprising logic, modules, or circuitry to perform one or more elements of the method 500. This apparatus may be, for example, an apparatus of a UE (such as a wireless device 802 that is a UE, as described herein).

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a UE (such as a wireless device 802 that is a UE, as described herein).

Embodiments contemplated herein include a signal as described in or related to one or more elements of the method 500.

Embodiments contemplated herein include a computer program or computer program product comprising instructions, wherein execution of the program by a processor is to cause the processor to carry out one or more elements of the method 500. The processor may be a processor of a UE (such as a processor(s) 804 of a wireless device 802 that is a UE, as described herein). These instructions may be, for example, located in the processor and/or on a memory of the UE (such as a memory 806 of a wireless device 802 that is a UE, as described herein).

Figure 6:
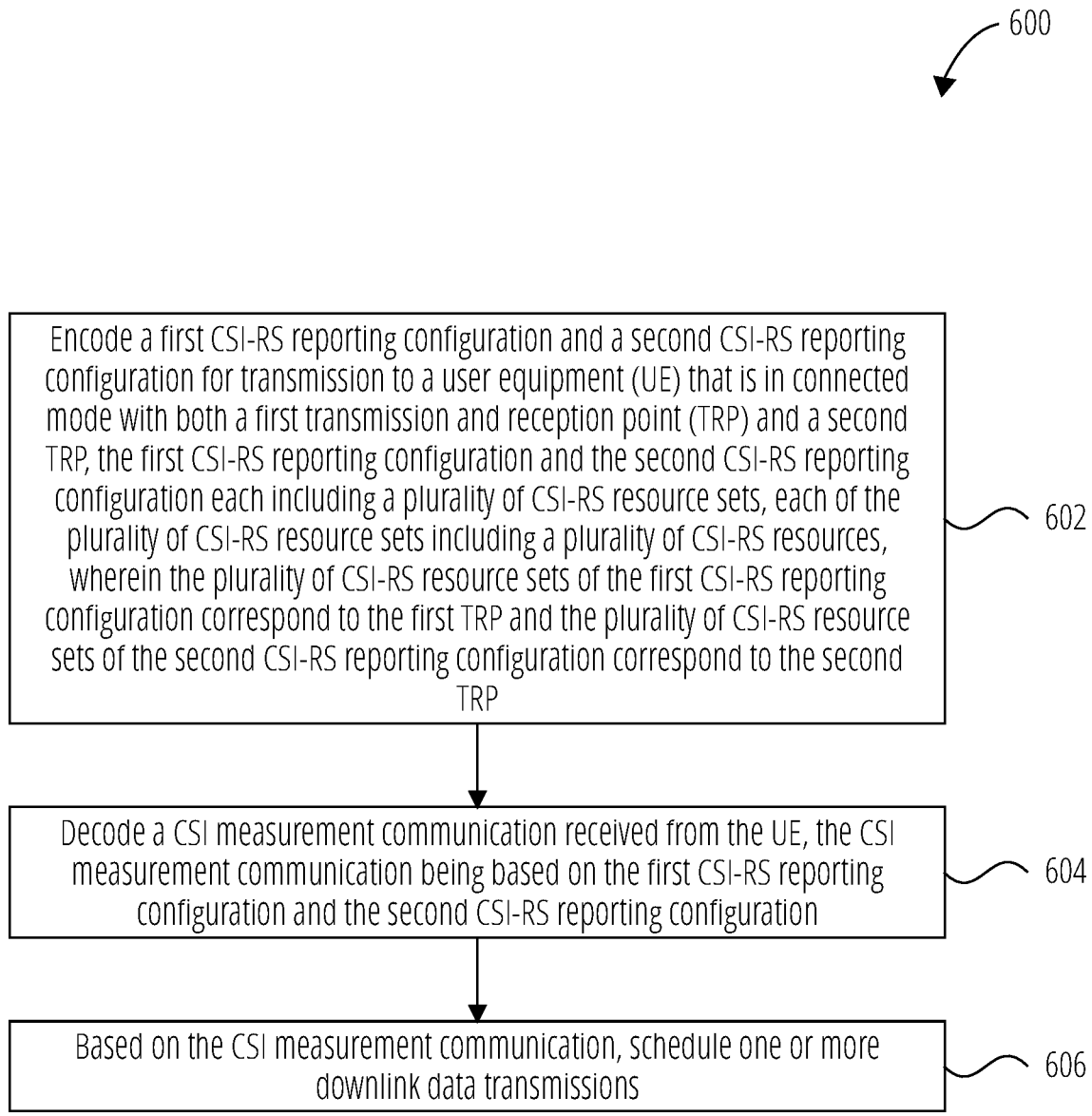
FIG. 6 illustrates a flowchart of a method for configuring CSI-RS reporting at a network, in accordance with one embodiment.

FIG. 6 illustrates a flowchart of a method 600 for configuring channel state information reference signal (CSI-RS) reporting at a network. In block 602, the method 600 encodes a first CSI-RS reporting configuration and a second CSI-RS reporting configuration for transmission to a user equipment (UE) that is in connected mode with both a first transmission and reception point (TRP) and a second TRP. For instance, the UE 306 may receive the CSI-ReportConfig 324 and the CSI-ReportConfig 326, as shown in FIG. 3.

The first CSI-RS reporting configuration and the second CSI-RS reporting configuration may each include a plurality of CSI-RS resource sets. For example, the CSI-ReportConfig 324 and the CSI-ReportConfig 326 of FIG. 3 each include a plurality of CSI-RS resource sets (e.g., the CSI-RS resource sets represented by block 328, block 330, block 332, and so forth). Each of the plurality of CSI-RS resource sets may include a plurality of CSI-RS resources. For instance, the CSI-RS resource sets of FIG. 3 (e.g., the CSI-RS resource sets represented by block 328, block 330, block 332, and so forth) include CSI-RS resources such as CSI-RS 0 308, CSI-RS 1 310, CSI-RS 2 312, and so forth.

The plurality of CSI-RS resource sets of the first CSI-RS reporting configuration may correspond to the first TRP and the plurality of CSI-RS resource sets of the second CSI-RS reporting configuration may correspond to the second TRP. For instance, the CSI-RS resource sets of CSI-ReportConfig 324 correspond to TRP 302 and the CSI-RS resource sets of CSI-ReportConfig 326 correspond to the TRP 304.

In block 604, the method 600 decodes a CSI measurement communication received from the UE. The CSI measurement communication may be based on the first CSI-RS reporting configuration and the second CSI-RS reporting configuration. For instance, the UE 306 may perform CMR and/or IMR measurements based on the configuration information within the CSI-ReportConfig 324 and CSI-ReportConfig 326 and transmit such measurement information to the network. In block 606, the method 600 based on the CSI measurement communication, schedules one or more downlink data transmissions. In an example, the network may schedule one or more downlink transmissions based on the measurement information received from the UE.

The method 600 may also include the first CSI-RS reporting configuration and the second CSI-RS reporting configuration each including at least one of: a same carrier information element (IE); a same reportConfigType IE including a same periodic or semi-persistent time domain behavior or a same pucch-CSI-ResourceList, reportSlotConfig, reportSlotOffsetList, or p0alpha; a same reportQuantity; a same reportFreqConfiguration; a same timeRestrictionForChannelMeasurements and timeRestrictionForInterferenceMeasurements; a same codebookConfig; a same groupBasedBeamReporting; a same channel quality indicator-table (cqi-table); a same subbandSize; or a same non-precoding matrix indicator-port indication (non-PMI-Port-Indication).

The method 600 may also include first channel measurement resources (CMRs) being configured for the first CSI-RS reporting configuration and second CMRs being configured for the second CSI-RS reporting configuration. In such embodiments, the first CMRs and the second CMRs may comprise different CMRs. The method 600 may also include, when computing CSI measurements for the first CSI-RS reporting configuration, a channel measurement resource (CMR), a precoding matrix indicator (PMI), and rank indicator (RI) from the second CSI-RS reporting configuration being used to determine an interference for the first TRP.

The method 600 may also include configuring an association between the first CSI-RS reporting configuration and the second CSI-RS reporting configuration, including one of: introducing a new information element (IE) in the first CSI-RS reporting configuration to indicate the association with the second CSI-RS reporting configuration, introducing a new IE in a CSI-MeasConfig to associate the first CSI-RS reporting configuration and the second CSI-RS reporting configuration; or duplicating the first CSI-RS reporting configuration to create the second CSI-RS reporting configuration. The second CSI-RS reporting configuration may have a same CSI-ReportConfigId as the first CSI-RS reporting configuration.

Embodiments contemplated herein include an apparatus comprising means to perform one or more elements of the method 600. This apparatus may be, for example, an apparatus of a base station (such as a network device 818 that is a base station, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a base station (such as a memory 822 of a network device 818 that is a base station, as described herein).

Embodiments contemplated herein include an apparatus comprising logic, modules, or circuitry to perform one or more elements of the method 600. This apparatus may be, for example, an apparatus of a base station (such as a network device 818 that is a base station, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a base station (such as a network device 818 that is a base station, as described herein).

Embodiments contemplated herein include a signal as described in or related to one or more elements of the method 600.

Embodiments contemplated herein include a computer program or computer program product comprising instructions, wherein execution of the program by a processing element is to cause the processing element to carry out one or more elements of the method 600. The processor may be a processor of a base station (such as a processor(s) 820 of a network device 818 that is a base station, as described herein). These instructions may be, for example, located in the processor and/or on a memory of the UE (such as a memory 822 of a network device 818 that is a base station, as described herein).

Figure 7:
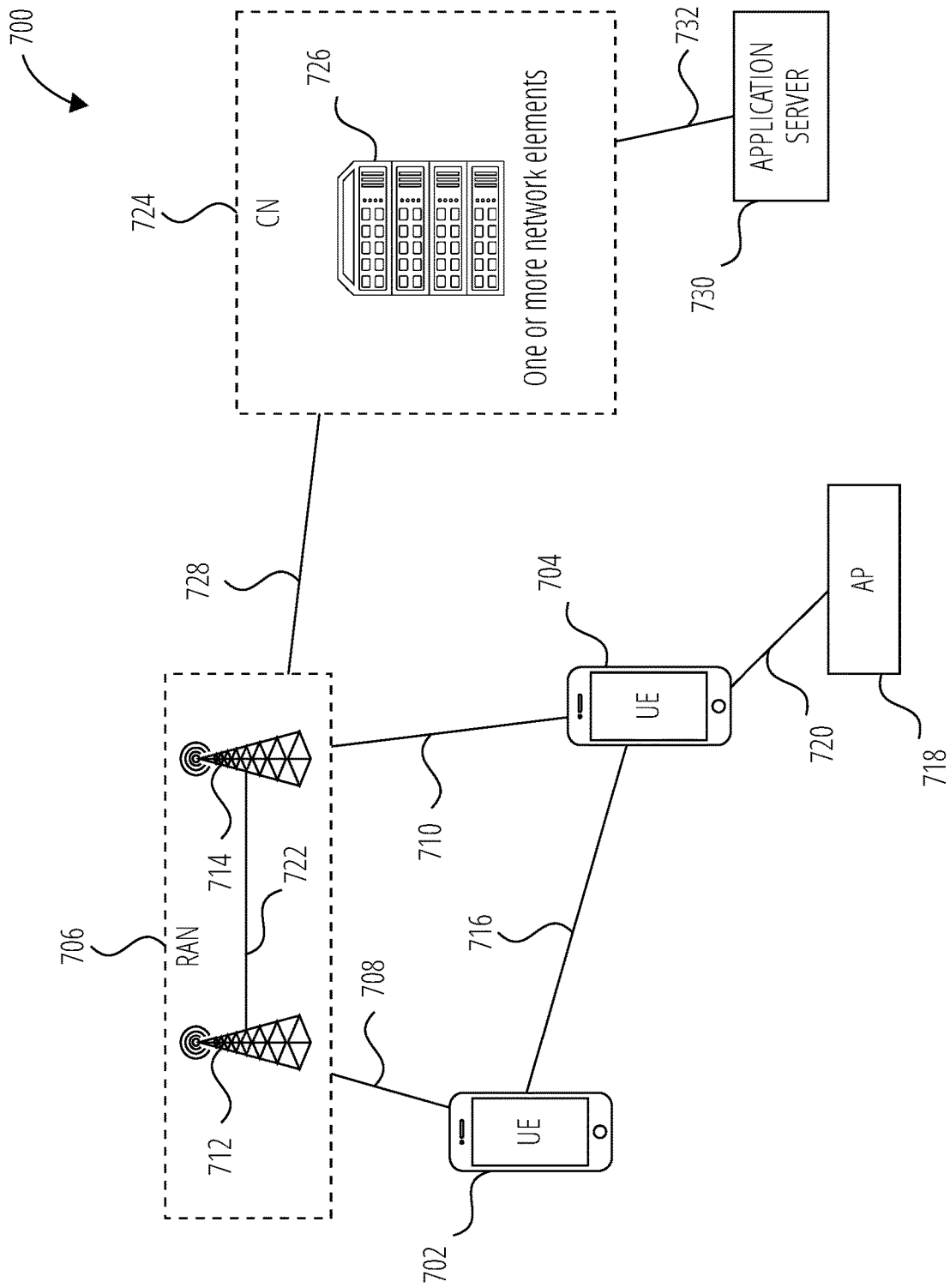
FIG. 7 illustrates an example architecture of a wireless communication system, according to embodiments disclosed herein.

FIG. 7 illustrates an example architecture of a wireless communication system 700, according to embodiments disclosed herein. The following description is provided for an example wireless communication system 700 that operates in conjunction with the LTE system standards and/or 5G or NR system standards as provided by 3GPP technical specifications.

As shown by FIG. 7, the wireless communication system 700 includes UE 702 and UE 704 (although any number of UEs may be used). In this example, the UE 702 and the UE 704 are illustrated as smartphones (e.g., handheld touchscreen mobile computing devices connectable to one or more cellular networks), but may also comprise any mobile or non-mobile computing device configured for wireless communication.

The UE 702 and UE 704 may be configured to communicatively couple with a RAN 706. In embodiments, the RAN 706 may be NG-RAN, E-UTRAN, etc. The UE 702 and UE 704 utilize connections (or channels) (shown as connection 708 and connection 710, respectively) with the RAN 706, each of which comprises a physical communications interface. The RAN 706 can include one or more base stations, such as base station 712 and base station 714, that enable the connection 708 and connection 710.

In this example, the connection 708 and connection 710 are air interfaces to enable such communicative coupling, and may be consistent with RAT(s) used by the RAN 706, such as, for example, an LTE and/or NR.

In some embodiments, the UE 702 and UE 704 may also directly exchange communication data via a sidelink interface 716. The UE 704 is shown to be configured to access an access point (shown as AP 718) via connection 720. By way of example, the connection 720 can comprise a local wireless connection, such as a connection consistent with any IEEE 802.11 protocol, wherein the AP 718 may comprise a Wi-Fi® router. In this example, the AP 718 may be connected to another network (for example, the Internet) without going through a CN 724.

In embodiments, the UE 702 and UE 704 can be configured to communicate using orthogonal frequency division multiplexing (OFDM) communication signals with each other or with the base station 712 and/or the base station 714 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 712 or base station 714 may be implemented as one or more software entities running on server computers as part of a virtual network. In addition, or in other embodiments, the base station 712 or base station 714 may be configured to communicate with one another via interface 722. In embodiments where the wireless communication system 700 is an LTE system (e.g., when the CN 724 is an EPC), the interface 722 may be an X2 interface. The X2 interface may be defined between two or more base stations (e.g., two or more eNBs and the like) that connect to an EPC, and/or between two eNBs connecting to the EPC. In embodiments where the wireless communication system 700 is an NR system (e.g., when CN 724 is a 5GC), the interface 722 may be an Xn interface. The Xn interface is defined between two or more base stations (e.g., two or more gNBs and the like) that connect to 5GC, between a base station 712 (e.g., a gNB) connecting to 5GC and an eNB, and/or between two eNBs connecting to 5GC (e.g., CN 724).

The RAN 706 is shown to be communicatively coupled to the CN 724. The CN 724 may comprise one or more network elements 726, which are configured to offer various data and telecommunications services to customers/subscribers (e.g., users of UE 702 and UE 704) who are connected to the CN 724 via the RAN 706. The components of the CN 724 may be implemented in one physical device or separate physical devices including components to read and execute instructions from a machine-readable or computer-readable medium (e.g., a non-transitory machine-readable storage medium).

In embodiments, the CN 724 may be an EPC, and the RAN 706 may be connected with the CN 724 via an S1 interface 728. In embodiments, the S1 interface 728 may be split into two parts, an S1 user plane (S1-U) interface, which carries traffic data between the base station 712 or base station 714 and a serving gateway (S-GW), and the S1-MME interface, which is a signaling interface between the base station 712 or base station 714 and mobility management entities (MMEs).

In embodiments, the CN 724 may be a 5GC, and the RAN 706 may be connected with the CN 724 via an NG interface 728. In embodiments, the NG interface 728 may be split into two parts, an NG user plane (NG-U) interface, which carries traffic data between the base station 712 or base station 714 and a user plane function (UPF), and the S1 control plane (NG-C) interface, which is a signaling interface between the base station 712 or base station 714 and access and mobility management functions (AMFs).

Generally, an application server 730 may be an element offering applications that use internet protocol (IP) bearer resources with the CN 724 (e.g., packet switched data services). The application server 730 can also be configured to support one or more communication services (e.g., VoIP sessions, group communication sessions, etc.) for the UE 702 and UE 704 via the CN 724. The application server 730 may communicate with the CN 724 through an IP communications interface 732.

Figure 8:
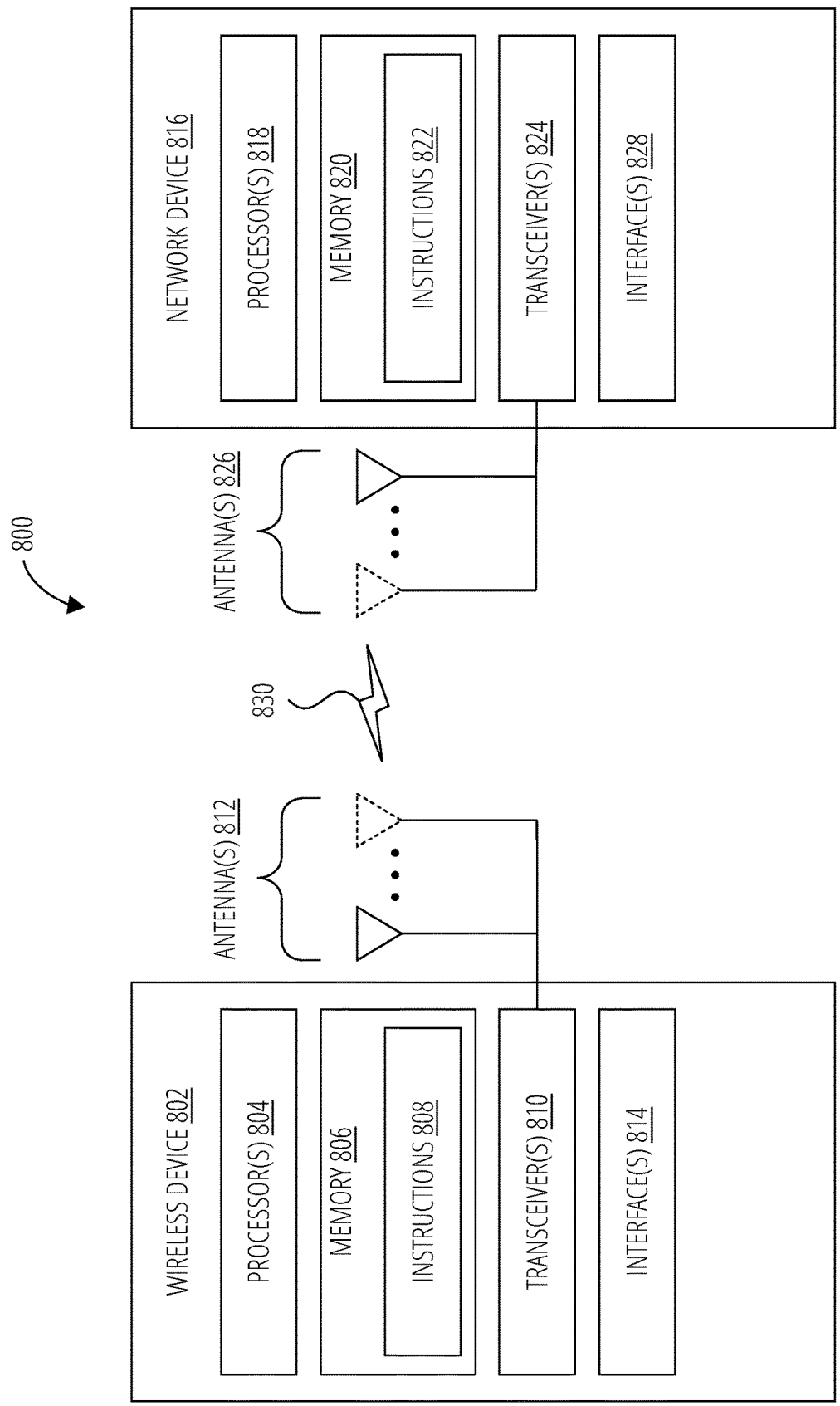
FIG. 8 illustrates a system for performing signaling between a wireless device and a network device, according to embodiments disclosed herein.

FIG. 8 illustrates a system 800 for performing signaling 834 between a wireless device 802 and a network device 818, according to embodiments disclosed herein. The system 800 may be a portion of a wireless communications system as herein described. The wireless device 802 may be, for example, a UE of a wireless communication system. The network device 818 may be, for example, a base station (e.g., an eNB or a gNB) of a wireless communication system.

The wireless device 802 may include one or more processor(s) 804. The processor(s) 804 may execute instructions such that various operations of the wireless device 802 are performed, as described herein. The processor(s) 804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 802 may include a memory 806. The memory 806 may be a non-transitory computer-readable storage medium that stores instructions 808 (which may include, for example, the instructions being executed by the processor(s) 804). The instructions 808 may also be referred to as program code or a computer program. The memory 806 may also store data used by, and results computed by, the processor(s) 804.

The wireless device 802 may include one or more transceiver(s) 810 that may include radio frequency (RF) transmitter and/or receiver circuitry that use the antenna(s) 812 of the wireless device 802 to facilitate signaling (e.g., the signaling 834) to and/or from the wireless device 802 with other devices (e.g., the network device 818) according to corresponding RATs.

The wireless device 802 may include one or more antenna(s) 812 (e.g., one, two, four, or more). For embodiments with multiple antenna(s) 812, the wireless device 802 may leverage the spatial diversity of such multiple antenna(s) 812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 802 may be accomplished according to precoding (or digital beamforming) that is applied at the wireless device 802 that multiplexes the data streams across the antenna(s) 812 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 802 may implement analog beamforming techniques, whereby phases of the signals sent by the antenna(s) 812 are relatively adjusted such that the (joint) transmission of the antenna(s) 812 can be directed (this is sometimes referred to as beam steering).

The wireless device 802 may include one or more interface(s) 814. The interface(s) 814 may be used to provide input to or output from the wireless device 802. For example, a 21 wireless device 802 that is a UE may include interface(s) 814 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 810/antenna(s) 812 already described) that allow for communication between the UE and other devices and may operate according to known protocols (e.g., Wi-Fi®, Bluetooth®, and the like).

The network device 818 may include one or more processor(s) 820. The processor(s) 820 may execute instructions such that various operations of the network device 818 are performed, as described herein. The processor(s) 804 may include one or more baseband processors implemented using, for example, a CPU, a DSP, an ASIC, a controller, an FPGA device, another hardware device, a firmware device, or any combination thereof configured to perform the operations described herein.

The network device 818 may include a memory 822. The memory 822 may be a non-transitory computer-readable storage medium that stores instructions 824 (which may include, for example, the instructions being executed by the processor(s) 820). The instructions 824 may also be referred to as program code or a computer program. The memory 822 may also store data used by, and results computed by, the processor(s) 820.

The network device 818 may include one or more transceiver(s) 826 that may include RF transmitter and/or receiver circuitry that use the antenna(s) 828 of the network device 818 to facilitate signaling (e.g., the signaling 834) to and/or from the network device 818 with other devices (e.g., the wireless device 802) according to corresponding RATs.

The network device 818 may include one or more antenna(s) 828 (e.g., one, two, four, or more). In embodiments having multiple antenna(s) 828, the network device 818 may perform MIMO, digital beamforming, analog beamforming, beam steering, etc., as has been described.

The network device 818 may include one or more interface(s) 830. The interface(s) 830 may be used to provide input to or output from the network device 818. For example, a network device 818 that is a base station may include interface(s) 830 made up of transmitters, receivers, and other circuitry (e.g., other than the transceiver(s) 826/antenna(s) 828 already described) that enables the base station to communicate with other equipment in a core network, and/or that enables the base station to communicate with external networks, computers, databases, and the like for purposes of operations, administration, and maintenance of the base station or other equipment operably connected thereto.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for configuring channel state information reference signal (CSI-RS) reporting at a network, comprising:
encoding a single CSI-RS reporting configuration for transmission to a user equipment (UE) that is in connected mode with both a first transmission and reception point (TRP) and a second TRP, the single CSI-RS reporting configuration including a plurality of CSI-RS resource sets, each of the plurality of CSI-RS resource sets including a plurality of CSI-RS resources, wherein at least one of the plurality of CSI-RS resource sets includes CSI-RS resources that correspond to the first TRP or the second TRP;
wherein at least a first of the plurality of CSI-RS resource sets comprises a non-zero power CSI-RS (NZP-CSI-RS) resource set and the plurality of CSI-RS resources of the NZP-CSI-RS resource set comprise a plurality of NZP-CSI-RS resources, wherein the NZP-CSI-RS resource set is configured for channel measurement and the plurality of NZP-CSI-RS resources are configured as channel measurement resources (CMRs);
wherein at least a second of the plurality of CSI-RS resource sets comprises a zero power CSI-RS (CSI-IM) resource set configured for interference measurement and the plurality of CSI resources of the CSI-IM resource set comprise a plurality of CSI-IM resources;
wherein when enhanced multi-TRP CSI is configured, a same number of the plurality of CSI-IM resources are configured as a number of the plurality of NZP-CSI-RS resources;
decoding a CSI measurement communication received from the UE, the CSI measurement communication being based on the single CSI-RS reporting configuration communication; and
based on the CSI measurement communication, scheduling one or more downlink data transmissions.

2. The method of claim 1, wherein the NZP-CSI-RS resource set includes a rule for splitting a first portion of the plurality of CSI-RS resources and a second portion of the plurality of CSI-RS resources between the first TRP and the second TRP, the plurality of CSI-RS resources comprising a plurality of NZP-CSI-RS resources.

3. The method of claim 2, wherein the rule for splitting the plurality of CSI-RS resources comprises a flag within the NZP-CSI-RS resource set directing the plurality of CSI-RS resources between the first TRP and the second TRP.

4. The method of claim 2, wherein the NZP-CSI-RS resource set is configured for channel measurement, the plurality of NZP-CSI-RS resources are configured as channel measurement resources (CMRs), and a same number of ports are configured for the first portion of the plurality NZP-CSI-RS resources corresponding to the first TRP and the second portion of the plurality of NZP-CSI-RS resources corresponding to the second TRP.

5. The method of claim 4, wherein when enhanced multi-TRP CSI is configured, the at least first of the plurality of CSI-RS resource sets comprising the NZP-CSI-RS resource set comprises a single NZP-CSI-RS resource set and the first portion of the plurality NZP-CSI-RS resources corresponding to the first TRP and the second portion of the plurality of NZP-CSI-RS resources corresponding to the second TRP comprise a same number of NZP-CSI-RS resources.

6. The method of claim 1, wherein the plurality of NZP-CSI-RS resources are configured as interference measurement resources (INRs) and do not correspond to either the first TRP or the second TRP such that all of the plurality of NZP-CSI-RS resources are shared between the first TRP and the second TRP.

7. The method of claim 1, wherein when the plurality of CSI-IM resources are configured as interference measurement resources (IMRs) and enhanced multi-TRP CSI is configured, the plurality of CSI-IM resources do not correspond to either the first TRP or the second TRP such that all of the plurality of CSI-IM resources are shared between the first TRP and the second TRP.

8. The method of claim 7, wherein interference measurements associated with a particular TRP of the first TRP and the second TRP only consider IMRs corresponding to the particular TRP.

9. The method of claim 7, wherein CMRs of the first TRP comprise IMRs of the second TRP.

10. A method for configuring channel state information reference signal (CSI-RS) reporting at a user equipment (UE), comprising:
decoding a single CSI-RS reporting configuration received from a network, the UE being in connected mode with both a first transmission and reception point (TRP) and a second TRP, the single CSI-RS reporting configuration including a plurality of CSI-RS resource sets, each of the plurality of CSI-RS resource sets including a plurality of CSI-RS resources, wherein at least one of the plurality of CSI-RS resource sets includes CSI-RS resources that correspond to the first TRP or the second TRP;

wherein at least a first of the plurality of CSI-RS resource sets comprises a non-zero power CSI-RS (NZP-CSI-RS) resource set and the plurality of CSI-RS resources of the NZP-CSI-RS resource set comprise a plurality of NZP-CSI-RS resources, wherein the NZP-CSI-RS resource set is configured for channel measurement and the plurality of NZP-CSI-RS resources are configured as channel measurement resources (CMRs);

wherein at least a second of the plurality of CSI-RS resource sets comprises a zero power CSI-RS (CSI-IM) resource set configured for interference measurement and the plurality of CSI resources of the CSI-IM resource set comprise a plurality of CSI-IM resources;

wherein when enhanced multi-TRP CSI is configured, a same number of the plurality of CSI-IM resources are configured as a number of the plurality of NZP-CSI-RS resources;

based on the received single CSI-RS reporting configuration communication, performing one or more measurements; and encoding a CSI measurement communication that includes information associated with the one or more performed measurements for transmission to the network.

11. The method of claim 10, wherein the NZP-CSI-RS resource set includes a rule for splitting a first portion of the plurality of CSI-RS resources and a second portion of the plurality of CSI-RS resources between the first TRP and the second TRP, the plurality of CSI-RS resources comprising a plurality of NZP-CSI-RS resources.

12. A non-transitory computer-readable media comprising instructions to cause a network device, upon execution of the instructions by one or more processors of the network device, to perform a method for configuring channel state information reference signal (CSI-RS) reporting at a network, the method comprising:

encoding a single CSI-RS reporting configuration for transmission to a user equipment (UE) that is in connected mode with both a first transmission and reception point (TRP) and a second TRP, the single CSI-RS reporting configuration including a plurality of CSI-RS resource sets, each of the plurality of CSI-RS resource sets including a plurality of CSI-RS resources, wherein at least one of the plurality of CSI-RS resource sets includes CSI-RS resources that correspond to the first TRP or the second TRP;

wherein at least a first of the plurality of CSI-RS resource sets comprises a non-zero power CSI-RS (NZP-CSI-RS) resource set and the plurality of CSI-RS resources of the NZP-CSI-RS resource set comprise a plurality of NZP-CSI-RS resources, wherein the NZP-CSI-RS resource set is configured for channel measurement and the plurality of NZP-CSI-RS resources are configured as channel measurement resources (CMRs);

wherein at least a second of the plurality of CSI-RS resource sets comprises a zero power CSI-RS (CSI-IM) resource set configured for interference measurement and the plurality of CSI resources of the CSI-IM resource set comprise a plurality of CSI-IM resources;

wherein when enhanced multi-TRP CSI is configured, a same number of the plurality of CSI-IM resources are configured as a number of the plurality of NZP-CSI-RS resources;

decoding a CSI measurement communication received from the UE, the CSI measurement communication being based on the single CSI-RS reporting configuration communication; and based on the CSI measurement communication, scheduling one or more downlink data transmissions.

13. The non-transitory computer-readable media of claim 12, wherein the NZP-CSI-RS resource set includes a rule for splitting a first portion of the plurality of CSI-RS resources and a second portion of the plurality of CSI-RS resources between the first TRP and the second TRP, the plurality of CSI-RS resources comprising a plurality of NZP-CSI-RS resources.

14. The non-transitory computer-readable media of claim 13, wherein the rule for splitting the plurality of CSI-RS resources comprises a flag within the NZP-CSI-RS resource set directing the plurality of CSI-RS resources between the first TRP and the second TRP.

15. The non-transitory computer-readable media of claim 13, wherein the NZP-CSI-RS resource set is configured for channel measurement, the plurality of NZP-CSI-RS resources are configured as channel measurement resources (CMRs), and a same number of ports are configured for the first portion of the plurality NZP-CSI-RS resources corresponding to the first TRP and the second portion of the plurality of NZP-CSI-RS resources corresponding to the second TRP.

16. The non-transitory computer-readable media of claim 15, wherein when enhanced multi-TRP CSI is configured, the at least first of the plurality of CSI-RS resource sets comprising the NZP-CSI-RS resource set comprises a single NZP-CSI-RS resource set and the first portion of the plurality NZP-CSI-RS resources corresponding to the first TRP and the second portion of the plurality of NZP-CSI-RS resources corresponding to the second TRP comprise a same number of NZP-CSI-RS resources.

17. The non-transitory computer-readable media of claim 12, wherein the plurality of NZP-CSI-RS resources are configured as interference measurement resources (IMRs) and do not correspond to either the first TRP or the second TRP such that all of the plurality of NZP-CSI-RS resources are shared between the first TRP and the second TRP.

18. The non-transitory computer-readable media of claim 12, wherein when the plurality of CSI-IM resources are configured as interference measurement resources (IMRs) and enhanced multi-TRP CSI is configured, the plurality of CSI-IM resources do not correspond to either the first TRP or the second TRP such that all of the plurality of CSI-IM resources are shared between the first TRP and the second TRP.

19. The non-transitory computer-readable media of claim 18, wherein interference measurements associated with a particular TRP of the first TRP and the second TRP only consider IMRs corresponding to the particular TRP.

20. The non-transitory computer-readable media of claim 18, wherein CMRs of the first TRP comprise IMRs of the second TRP.

\* \* \* \* \*